United States Patent [19]

Sindorf et al.

[11] Patent Number: 5,264,301
[45] Date of Patent: Nov. 23, 1993

[54] METAL OXIDE-HYDROGEN BATTERY INCORPORATING A MECHANISM FOR MAINTAINING A CONSTANT PRESSURE IN THE BATTERY

[75] Inventors: John F. Sindorf, Pewaukee; William P. Segall, Grafton, both of Wis.

[73] Assignee: Globe-Union Inc., Milwaukee, Wis.

[21] Appl. No.: 868,318

[22] Filed: Apr. 14, 1992

[51] Int. Cl.$^5$ .................. H01M 2/12; H01M 10/52
[52] U.S. Cl. ........................... 429/53; 429/58; 429/61; 429/101
[58] Field of Search ............... 429/53, 54, 61, 58, 429/101

[56] References Cited

U.S. PATENT DOCUMENTS

| | | | |
|---|---|---|---|
| 2,914,595 | 11/1959 | Darland, Jr. et al. | |
| 3,287,174 | 11/1966 | Hennigan et al. | |
| 3,445,287 | 5/1969 | Schölzel | 429/53 |
| 3,470,025 | 9/1969 | Yehiely | 429/58 |
| 3,990,910 | 11/1976 | Giner et al. | 429/59 |
| 4,329,406 | 5/1982 | Dahl et al. | 429/53 X |
| 4,605,603 | 8/1986 | Kanda | 429/59 |
| 4,636,445 | 1/1987 | Yamano | 429/53 |
| 4,788,112 | 11/1988 | Kung | 429/54 |
| 4,820,597 | 4/1989 | Lim et al. | 429/101 X |
| 4,925,748 | 5/1990 | Ikoma et al. | 429/59 |
| 5,041,345 | 8/1991 | O'Hara | 429/53 |
| 5,082,754 | 1/1992 | Jones | 429/101 |

Primary Examiner—Stephen Kalafut
Attorney, Agent, or Firm—Andrus, Sceales, Starke & Sawall

[57] ABSTRACT

A metal oxide-hydrogen battery incorporating a system for maintaining a substantial uniform range of pressure of hydrogen gas in the battery. The battery includes an outer pressure vessel and a plurality of cells are contained in the vessel. A liquid electrolyte is impregnated within the cells and the battery is charged with hydrogen gas. A conduit connects the interior of the vessel with a venting zone, preferably a closed chamber, containing a hydrogen absorbing material. A first valve is located in the conduit and is designed to open when the battery is discharged to a preselected level. A second pressure regulated valve is also mounted in the conduit and opens to vent hydrogen from the vessel to the chamber, if the hydrogen pressure exceeds a predetermined value at the preselected state of discharge. The sequential venting of hydrogen during cycling of the battery will maintain the pressure of hydrogen in the vessel within a given range.

17 Claims, 1 Drawing Sheet

METAL OXIDE-HYDROGEN BATTERY INCORPORATING A MECHANISM FOR MAINTAINING A CONSTANT PRESSURE IN THE BATTERY

BACKGROUND OF THE INVENTION

Metal oxide-hydrogen batteries, such as nickel oxide-hydrogen batteries, have seen use as aircraft starter batteries and in aerospace applications, because they are rechargeable, have an extremely long cycle life and provide a uniform output during the entire discharge cycle.

In the typical nickel oxide-hydrogen battery, the battery cells are sealed in an outer pressure vessel that contains pressurized hydrogen gas. On discharge of the battery, the hydrogen gas diffuses through the electrolyte surrounding the catalyst surfaces of the negative plates or electrodes and becomes disassociated to the mono-atomic form. The mono-atomic hydrogen is ionized and combines with hydroxyl ions to form water with an electron being released in the process of forming each hydrogen ion. In addition, hydroxyl ions are formed at the positive electrode by the reaction of water with the available oxygen content of the nickel-oxide. As a result of these reactions, an electron current is produced in an exterior circuit.

On recharging, the reaction is reversed, with the recharging being characterized by the regeneration of the hydrogen at the negative electrode and the reoxidation of the nickel-hydroxide at the positive electrode.

In use, a typical metal oxide-hydrogen battery may be subjected to thousands of discharging and charging cycles, and it is recognized that the operating hydrogen pressure range increases as the battery is cycled. For example, at a fully charged state, the hydrogen gas pressure in an individual pressure vessel (IPV) may originally be in the neighborhood of about 600 psi. After several thousand cycles, the hydrogen pressure at the fully charged state, may increase to a value of about 900 psi. In a common pressure vessel (CPV) containing a number of cells, the hydrogen pressure may originally be about 300 psi at the fully charged state and after cycling can increase by 0.03 to 0.30 psi per cycle, depending upon rate and temperature.

It is desirable to utilize the hydrogen pressure within the vessel as a means for indicating the state of charge of the battery, or for charge and discharge control. However, if the pressure at any given state of charge substantially increases with cycling, the pressure cannot be satisfactorily used for these functions. For example, it would be desirable to use the hydrogen pressure to determine the state of charge of the battery and prevent overcharge. However, if the operating hydrogen pressure range increases through cycling, a pressure measurement which would normally indicate full charge would actually be an indication of less than full charge, due to the increase in hydrogen pressure, thus providing a false indication as to the state of charge of the battery.

SUMMARY OF THE INVENTION

The invention is directed to a metal oxide-hydrogen battery, such as a nickel oxide-hydrogen battery, preferably a CPV type, incorporating a system for maintaining a substantially uniform operating pressure range of hydrogen gas in the vessel.

The battery includes an outer closed pressure vessel that contains a plurality of cells, each having one or more positive and negative electrodes which can be connected together either in series or parallel relation to obtain the desired voltage output.

A liquid electrolyte, such as potassium hydroxide solution, is impregnated in the cells and the battery is charged with hydrogen gas at a high pressure, generally in the range of about 300 psi for fully charged cells in a common pressure vessel.

In accordance with the invention, a conduit connects the interior of the vessel with a hydrogen venting zone, which in the preferred form of the invention comprises a closed chamber or container that is located within the pressure vessel and contains a hydrogen absorbing material, such as lanthanum nickel hydride.

A pair of valves are connected in the conduit with a first of the valves designed to open when the battery is discharged to a preselected state, which can be about one volt per cell. The second valve located in the conduit is a pressure regulating valve which is designed to open to vent hydrogen from the vessel to the closed chamber, if the first valve is open and the pressure within the vessel at the designated state of discharge exceeds a given or predetermined value, which normally would be about 50 psi.

As the battery is discharged and the state of discharge reaches the preselected value, i.e. 1 volt per cell, the first valve is caused to be open, and if the hydrogen pressure in the vessel at this time exceeds the given value, i.e. 50 psi, the pressure regulated valve will then open to vent hydrogen from the vessel to the closed chamber. When the pressure in the vessel drops to about the pre-selected pressure, the pressure regulated valve closes. The hydrogen in the chamber is absorbed on the hydrogen absorbing material. As the hydrogen is being absorbed, the pressure in the chamber drops to the equilibrium pressure, which is typically about 20 psi, and the chamber will then accept hydrogen during the next standardization cycle.

It is contemplated that instead of venting the hydrogen to the closed chamber contained within the vessel, the hydrogen can be vented to the exterior of the pressure vessel.

With the system of the invention, the hydrogen pressure is maintained at a predetermined range throughout the cycling and the pressure at any given state of charge will remain substantially constant. Therefore, the hydrogen pressure can be used for charge and discharge control and to provide an accurate indication of the state of charge of the battery.

Other objects and advantages will appear in the course of the following description.

DESCRIPTION OF THE DRAWINGS

The drawings illustrate the best mode presently contemplated of carrying out the invention.

In the drawing:

Figure 1:
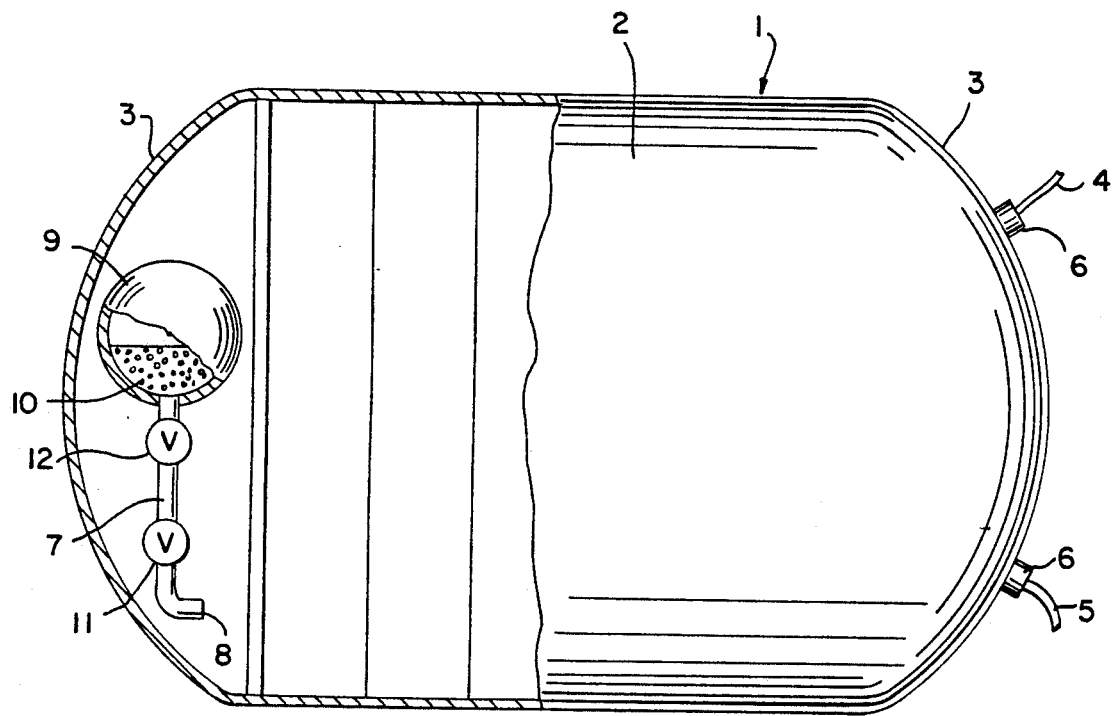

The drawing is a diagrammatic view of a typical metal oxide-hydrogen battery incorporating the system of the invention.

DESCRIPTION OF THE ILLUSTRATED EMBODIMENT

The drawing diagrammatically illustrates a rechargeable, metal oxide-hydrogen battery, such as a nickel oxide-hydrogen CPV battery. The battery is composed of an outer pressure vessel 1 that houses a group of battery cells 2. In general, each cell can be composed of a pair of back-to-back-positive electrodes spaced apart by a separator layer, along with a pair of negative electrodes, each disposed adjacent and separated from a positive electrode. The positive electrodes are generally in the form of flat porous sintered metal plaques impregnated with nickel hydroxide, while the negative electrodes are in the form of fine mesh nickel screens having a catalyst, such as platinum black, bonded to one surface of the screen through a hydrophobic polymeric material. An electrolyte, such as potassium hydroxide solution, is impregnated into the fibrous separator layers that separate the electrodes. The cells can be connected together either in series or parallel relation to obtain the desired voltage output. The construction of the outer pressure vessel 1, and the cell modules 2 is conventional and in itself forms no part of the present invention.

The vessel 1 is formed of a high strength, corrosion resistant metal, such as stainless steel or Inconel, and includes a cylindrical shell 2, the ends of which are enclosed by dome-shaped heads 3. If desired, a filament wound layer of fiber reinforced resin, not shown, can be wound around the metal vessel 1 by conventional filament winding techniques.

Electrical leads 4 and 5 are connected to the electrodes of the cell modules and extend in sealed relation through fittings 6 in one of the heads 3 to the exterior.

Pressure vessel 1 is charged with hydrogen gas and initially, with the battery in the fully charged state, the hydrogen gas pressure will generally be about 300 psi. On discharge of the battery, pressure will decrease to a minimum value of about 50 psi at charge state of about 1 volt per cell. On recharging, hydrogen will be generated and the pressure will increase back to approximately the original value. During this cycling of the battery, it has been recognized that the operating hydrogen pressure range will increase. It is believed that the increase in pressure comes about because more and more of the nickel substrate is oxidized, which removes oxygen from the system and decreases the amount of oxygen available to react with the hydrogen gas, thus resulting in an increase in hydrogen gas pressure.

In accordance with the invention, a system is provided to maintain the hydrogen gas pressure within a substantially constant operating range. In this regard, a conduit or pipe 7 is located within vessel 1, and has an open end 8 exposed to the interior of the vessel, while the opposite end of the conduit is connected to a closed chamber or container 9, that contains a mass of hydrogen absorbing material 10, which can take the form of lanthanum nickel hydride, palladium oxide, or the like. The material 10 is a type commonly used to react with and absorb hydrogen gas.

Located in conduit 7 are valves 11 and 12. Valve 11 is controlled electronically through the voltage output of the battery and is designed to open when the battery has discharged to a pre-selected value, which is generally about 1 volt per cell.

Valve 12 is a pressure regulated valve and acts to open when valve 11 is open and the pressure in the vessel 1 exceeds a given or predetermined minimum value such as 50 psi. With valve 11 open at the preselected state of discharge, and if the pressure in the vessel is greater than 50 psi, valve 12 will then open to vent the excess pressure to chamber 9, where the hydrogen gas will be absorbed on the material 10. For the pressure in the vessel to fall below the given pressure, the battery would have to have been discharged below 1 volt per cell. Valve 11, in this situation, would be closed as would valve 12.

As the hydrogen gas is absorbed on material 10, and both valve 11 and valve 12 are closed, the pressure in the chamber 9 will decrease to the equilibrium pressure of about 20 psi and the chamber will then be able to accept additional hydrogen gas in the next cycle.

With the invention, the hydrogen pressure at any given state of discharge will remain substantially constant during recycling and this will enable the hydrogen pressure to be used for charge and discharge control of the battery, as well as providing an accurate indication of the state of charge.

It is contemplated that in some installations, the hydrogen gas can be vented through conduit 7 directly to the exterior of pressure vessel 1, thus eliminating the need for the chamber 9 and the hydrogen absorbing material 10. However, when the battery is to be used in confined or sealed areas, the venting of hydrogen into the confined area may provide an explosive hazard, so in that situation, the enclosed chamber 8 is utilized.

Various modes of carrying out the invention are contemplated as being within the scope of the following claims particularly pointing out and distinctly claiming the subject matter which is regarded as the invention.

We claim:

1. In a metal oxide-hydrogen battery, an outer sealed pressure vessel, at least one cell disposed within the vessel, said cell including a positive electrode and a negative electrode, an electrolyte impregnated within said cell, a quantity of pressurized hydrogen gas disposed within said pressure vessel, and means operable as a consequence of the battery being discharged to a preselected state for venting hydrogen gas from said vessel when the pressure of said gas exceeds a preselected value.

2. In a metal oxide-hydrogen battery, an outer sealed pressure vessel, at least one cell disposed in said vessel with each cell including a positive electrode and a negative electrode, connecting means for connecting the electrodes in an electrical circuit, an electrolyte impregnated in said cell, a quantity of pressurized hydrogen gas disposed in said vessel, conduit means connecting the interior of the vessel with a gas discharge site, first valve means disposed in said conduit means, means operably connected to said first valve means for opening said first valve means when the battery has discharged to a pre-selected level, and pressure responsive valve means in said conduit means and operable as a consequence of opening of said first valve means for venting a portion of the hydrogen gas in the vessel to said discharge site if the gas pressure exceeds a preselected value.

3. The battery of claim 2, wherein said discharge site comprises a closed chamber containing a hydrogen absorbing material.

4. The battery of claim 3, wherein said material is lanthanum nickel hydride.

5. The battery of claim 3, wherein said chamber is disposed in said vessel.

6. The battery of claim 2, wherein said preselected level comprises approximately 1 volt per cell.

7. The battery of claim 4, wherein said hydrogen gas is at a first elevated pressure when said battery is fully charged and said pressure responsive valve means is constructed and arrange to open said conduit means at a second pressure substantially below said first pressure.

8. The battery of claim 7, wherein said first pressure is approximately 300 psi and said second pressure is approximately 50 psi.

9. A method of maintaining a given hydrogen pressure operating range in a metal oxide-hydrogen battery, comprising the steps of determining the hydrogen pressure in the vessel when the battery is at a preselected state of discharge, and bleeding hydrogen from the vessel when said pressure at said preselected state of discharge exceeds a preselected pressure to thereby maintain said preselected pressure at said pre-selected state of discharge.

10. A method of maintaining a given hydrogen pressure operating range in a metal oxide hydrogen battery, comprising the steps of monitoring the state of discharge of the battery, sensing the pressure of hydrogen gas in the vessel when the battery has discharged to a pre-selected low level, and venting hydrogen from the vessel if the pressure of hydrogen gas exceeds a preselected value when said battery is at said preselected level of discharge.

11. The method of claim 10, wherein the step of venting hydrogen gas comprises venting said gas to a location outside of said vessel.

12. The method of claim 10, wherein the step of venting the gas comprises venting the gas to a closed chamber disposed within the vessel and containing a hydrogen absorbing material.

13. The method of claim 12, and including the step of maintaining the pressure in said chamber at about said preselected value.

14. The method of claim 10, wherein the step of sensing the pressure is carried out when the state of charge of said battery is at a level of about 1 volt per cell.

15. A method of maintaining a given operating range of hydrogen pressure in a metal oxide-hydrogen battery, said battery including an outer pressure vessel containing a plurality of cells and containing pressurized hydrogen gas, said method comprising the step of connecting a conduit between the interior of the vessel and a gas discharge site, opening the conduit when the battery is at a preselected state of discharge and the pressure of hydrogen gas exceeds a preselected pressure to thereby vent a portion of said hydrogen gas to said discharge site, and closing the conduit when the pressure in the vessel is at about said preselected pressure.

16. The method of claim 15, wherein said discharge site comprises a chamber containing a hydrogen absorbing material, and said method includes the step of flowing the vented hydrogen through said conduit into contact with said hydrogen absorbing material.

17. The method of claim 15, and including the step of maintaining the pressure in said chamber at a value less than said preselected pressure.

* * * * *